3 Sheets—Sheet 1.
B. BARON.
Assignor to the BARON MACHINE COMPANY OF BALTIMORE CITY.
METHOD OF AND MACHINE FOR MAKING CIGAR FILLERS.
No. 11,199. Reissued Oct. 27, 1891.
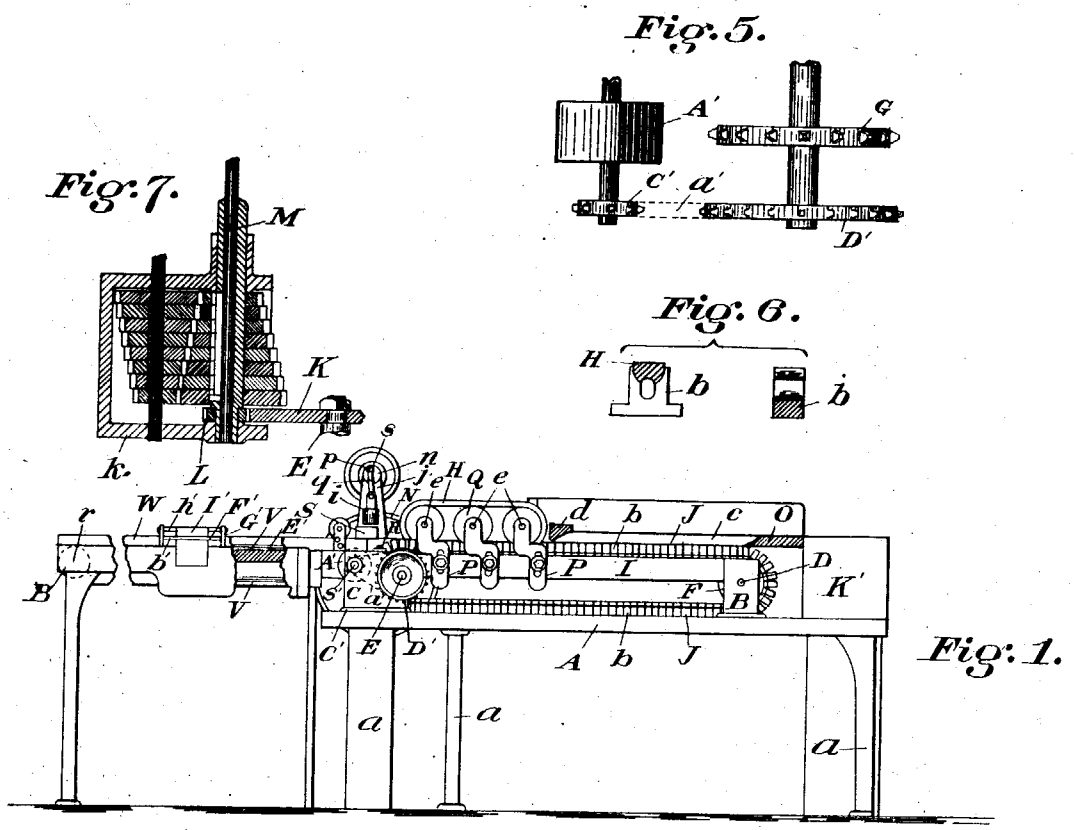
Witnesses
J. K. E. Diffendiffer
G. Mormann.
Bernhard Baron
Inventor
By his Attorneys
Price & Steward 3 Sheets—Sheet 2.

B. BARON.

Assignor to the BARON MACHINE COMPANY OF BALTIMORE CITY.

METHOD OF AND MACHINE FOR MAKING CIGAR FILLERS.

No. 11,199. Reissued Oct. 27, 1891.

Witnesses
J. K. E. Diffenderffer
G. Mormann

Bernhard Baron
Inventor

By his Attorneys
Price & Stewart

3 Sheets—Sheet 3.
B. BARON.
Assignor to the BARON MACHINE COMPANY OF BALTIMORE CITY.
METHOD OF AND MACHINE FOR MAKING CIGAR FILLERS.
No. 11,199. Reissued Oct. 27, 1891.
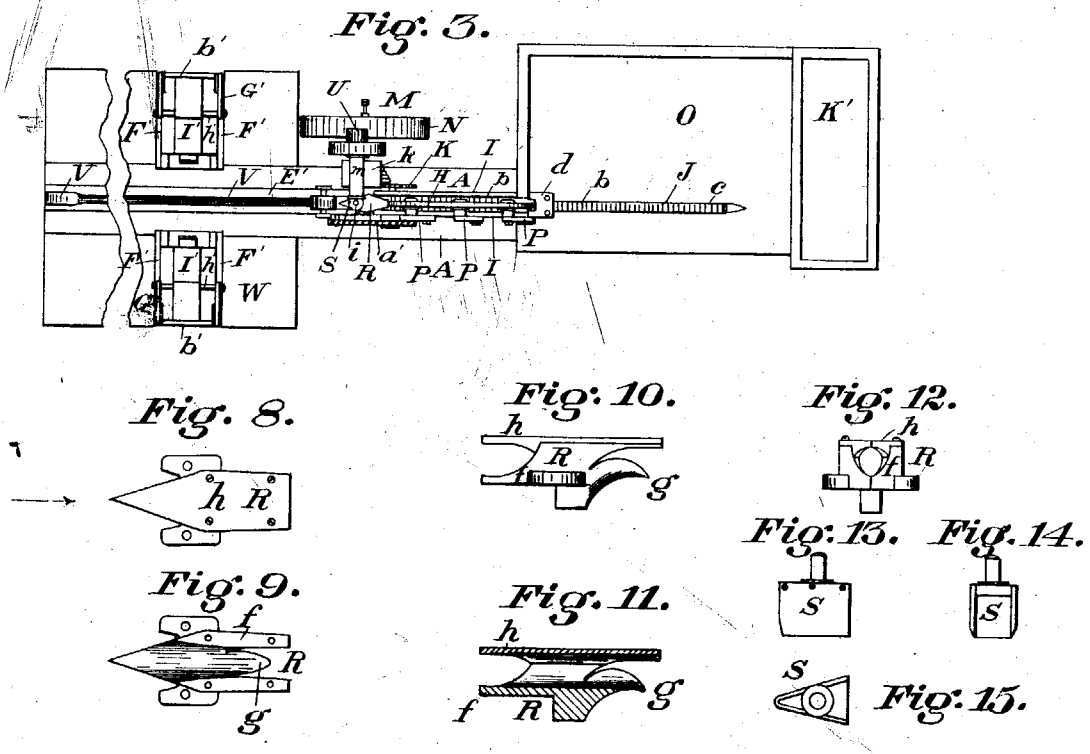
Witnesses
J. K. E. Diffendrieffer
G. Mormann.
Bernhard Baron
Inventor
By his Attorneys
Price & Stewart

UNITED STATES PATENT OFFICE.

BERNHARD BARON, OF BALTIMORE, MARYLAND, ASSIGNOR TO THE BARON MACHINE COMPANY OF BALTIMORE CITY.

METHOD OF AND MACHINE FOR MAKING CIGAR-FILLERS.

SPECIFICATION forming part of Reissued Letters Patent No. 11,199, dated October 27, 1891.

Original No. 452,012, dated May 12, 1891. Application for reissue filed July 17, 1891. Serial No. 399,882.

*To all whom it may concern:*

Be it known that I, BERNHARD BARON, of Baltimore, Maryland, have invented certain Improvements in Methods of and Machines for Making Cigar-Fillers, of which the following is a specification.

In the description of the said invention which follows, reference is made to the accompanying drawings, forming a part hereof, and in which—

Figure 1:
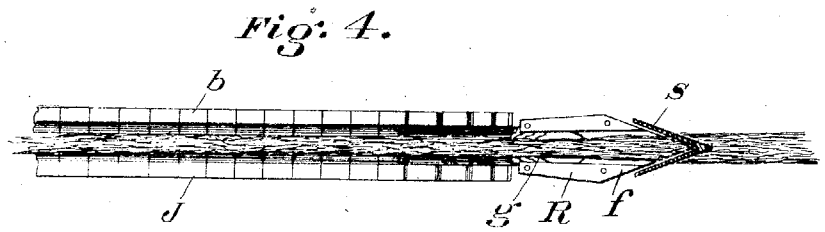
Figure 2:
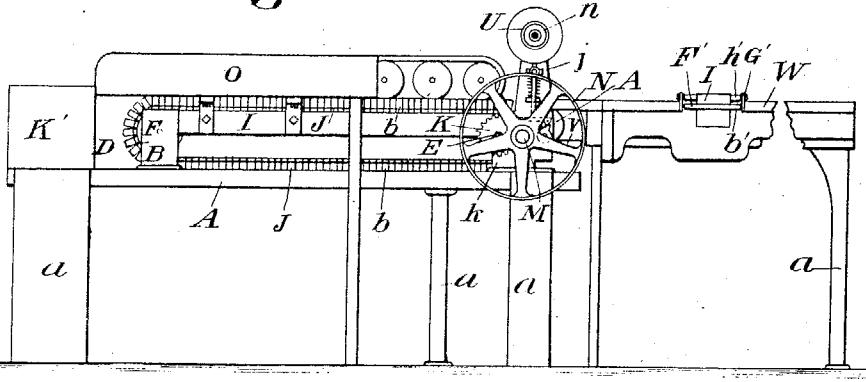

Figure 1 is a side elevation of the improved machine with certain parts thereof removed to show the interior. Fig. 2 is a similar view, except that the reverse side of the machine is shown. Fig. 3 is a plan of the invention. Figs. 4 to 15 are details of the invention on an enlarged scale and hereinafter fully described.

Referring to the drawings, A is the frame of the machine, having legs *a*.

B and C are stands erected on the frame A, and D and E shafts supported in the said stands, carrying the sprocket-wheels F and G. An ordinary link-chain belt (not shown) is stretched over the sprocket-wheels F and G, and to this are secured the blocks *b*. These blocks are each grooved, as shown in Fig. 6, which illustrates two views of one block. The lower portion of the groove is semicircular and the upper part is widened to receive a band, hereinafter described.

I I represent bars extending between the stands B and C immediately below the grooved traveling band J, formed by the blocks *b* to support the same and retain its upper part in a straight line. The means for actuating the grooved traveling band J consist of a spur-wheel K on the shaft E in gear with a pinion L on the main driving shaft M, which is provided with a driving pulley N. The spur-wheel K, pinion L, and the driving-shaft M are shown on an enlarged scale in Fig. 7. The sprocket-wheel G, together with certain parts hereinafter described, are shown on an enlarged scale in Fig. 5. It will be understood that the sprocket-wheel F is an idler and driven by the chain to which the grooved traveling band J is secured.

O is a table situated over a portion of the grooved traveling band J, having a slot *c* of a width corresponding with the enlarged part of the groove in the band J and of any convenient length. The surface of the table O is flat and horizontal, so that the tobacco-leaves from which the filler is to be made may be scattered over it and remain where placed without having any tendency to fall into the slot *c*. The object of the slot *c* is to provide means whereby the tobacco used in forming a continuous filler is introduced in bundles directly into the groove of the band J, and in order to compress the said tobacco as it leaves the hands of the attendant and before it reaches the main compressing mechanism, hereinafter described, an inclined block *d* is secured over the slot *c* at the forward side of the table, as shown in Figs. 1 and 3.

P P represent brackets bolted to one of the bars I, having studs *e*, which carry sheaves Q. These sheaves are connected by the rubber belt or band H, hereinbefore alluded to, which has an outer grooved face which traverses the enlarged portion of the groove in the band J, as shown particularly in Fig. 6. By referring to this figure it will be seen that the grooved face of the rubber belt or band H and the bottom of the groove in the band J form nearly a correct circle. Hence the compressed continuous filler is practically a round rope composed of bundles of tobacco-leaves, which bundles are lapped at their ends as fed by the attendant through the slot *c* in the table O to the grooved band J. In order to admit of adjustment of the rubber belt or band H as regards its vertical position within the groove in the band J, the brackets P are slotted to receive the bolts which hold them to one of the bars I. (See Fig. 1.)

R is a switch-block to detach the continuous filler after its compression from the grooved traveling band J. This block consists of a grooved lower plate *f*, having a spur *g*, which enters the groove in the band J and bears closely against its bottom. To the lower plate *f* is attached the upper plate or cover *h*, which is also grooved.

Fig. 8 is a top view of the complete switch-block, and Fig. 9 a similar view with the upper plate *h* removed. Fig. 10 is an exterior side view of the switch-block, and Fig. 11 a longitudinal central section of the same. Fig. 12 is an end view of Fig. 8, looking in the direction indicated by the arrow.

By reference to Figs. 8 and 9 it will be seen that the rear end of the switch-block is tapered to a point. The object of this shape is to admit of a similarly-shaped knife S being applied thereto to cut the continuous filler. This knife is shown on a small scale in Figs. 1 and 3 and on an enlarged scale in Figs. 4, 13, 14, and 15. Fig. 4 is a top view of the grooved traveling band J, the lower plate *f* of the switch-block R, a section of the knife S, and the continuous tobacco-filler. Fig. 13 is an exterior side view of the knife S, and Fig. 14 a view of the same as seen from the larger end. Fig. 15 is a top view of the knife.

Referring particularly to Fig. 4 it will be seen that the knife S co-operates with the tapered end of the switch-block to produce a shearing cut, and that the filler is held in a compressed condition within the switch-block while the cut is made. The action of the switch-block in this respect is similar to that of the hand when holding a rope of tobacco, the end of which is to be severed or cut off.

T is a stem adapted to have a sliding movement within a lug *i* on the face of a stand *j*, erected on or forming an extension of a box *k*, which is seated on the frame A. The upper part of this stand constitutes a sleeve *m*, in which a revoluble shaft *n* (shown only in dotted lines in Fig. 1) is inclosed. To the outer end of this shaft is detached a loose pulley U, which is driven by a belt. (Not shown.) To the inner end of the shaft *n* is secured a crank-disk *s*, having a crank-pin *p*. This pin is united to the knife-stem T by a link *q*. In the revolution of the shaft *n* the knife is made to have a vertical reciprocating movement, and at each downward stroke a short filler is cut from the continuous one.

A clutch mechanism is employed between the loose pulley and the shaft *n*, so that only an intermittent action of the knife is produced, and this action is regulated so as to increase or diminish the number of cuts per minute, and consequently vary the length of the short filler by means of a system of cone gears (shown in Fig. 7;) but I do not claim any invention in the mechanism for producing the alternate reciprocating movement of the knife S, as the devices used are all of a well-known character.

V is an endless flexible belt to convey the short fillers as cut from the continuous filler to the table W, where they are provided with binders. This endless belt is stretched over the rollers A′ and B′, having their spindles *s′* and *t′* supported in bearings in the stand of the machine. The spindle *s′*, carrying the roller A′, is provided at its outer end with a sprocket-wheel C′, driven by a chain *a′* from the sprocket-wheel D′ on the shaft E. The sprocket-wheels C′ and D′, together with the roller A′ and the sprocket-wheel G, are shown on an enlarged scale in Fig. 5. The endless belt V passes through or traverses a gutter E′, which is narrower than the belt, and in consequence the said belt becomes curved or hollowed, and thereby better adapted to convey the cut fillers without injuring them than a belt having a flat surface. The table W extends laterally from the sides of the machine and is on a level with the endless belt V. The operators who apply the binders to the fillers sit at the table, and before each operator is an opening F′, provided with metallic rails at the sides, and in this opening and supported by the rails is a carriage G′, having a roller *h′*.

I′ is an apron formed of a piece of canvas, rubber, or some other suitable material, attached at its ends to strips *b′*. Pockets are formed in the surface of the table W, into which the aprons are depressed to form loops to receive the binders and fillers. The fillers are rolled up by the lateral movement of the rollers. The mechanism here briefly described for rolling up the fillers in the binders in itself forms no part of this invention, it being commonly in use in cigar-making factories.

The machine being in motion, the operation of making a continuous tobacco-filler and cutting the same into short pieces, which are adapted as or constitute the fillers proper, is as follows: The tobacco is first reduced to strips by tearing, cutting, or stripping the leaf longitudinally thereof, and the material thus prepared is placed in a box K′ at the end of the table O. From this box it is taken by the feeding attendant and placed on the table O, where it is separated into bundles of the proper size, which are inserted into the slot *c*, and thence forced directly into the grooved traveling band J with their ends lapped. By the exposure through the slot *c* of the table of a considerable portion of the grooved band J the feeding-attendant is enabled to distribute the bundles so as to form a continuous filler of practically a uniform density, and to so thoroughly press the tobacco into the said grooved band that the rubber belt or band H will meet with no unnecessary obstruction in compressing it. The continuous filler is compressed to a compact rope before it passes from under the rubber belt or band H, and in this compressed condition it is guided from the grooved band J and forced into the switch-block R, where it is held while its end is severed by the knife S.

I am aware that it is not new to form a continuous rope of tobacco the filaments of which lap so as to make a tenacious body, and such a rope or continuous filler I disclaim; but I am not aware that before my invention thereof a continuous filler for cigars has been made from bundles of leaves placed with their ends lapped, as herein described.

I make no claim herein to the combination of a grooved traveling band, compressing devices which enter the groove in the said band to form the upper side of a continuous filler, a switch-block to turn out the continuous filler from the said grooved traveling band, and a knife to cut the continuous filler into short fillers for cigars, nor to the said elements in combination with an endless apron or belt to carry off the short fillers, as such combinations are claimed in my patent, No. 452,011, for a machine for making fillers for cigars.

I claim as my invention—

1. The method of forming a continuous filler to be afterward cut into proper lengths for cigars, herein described, which consists in first grouping a number of leaves of tobacco parallel in the direction of their length to form a bundle of approximately the diameter of a cigar-bunch to be formed, then feeding the bundle so formed to a compressing mechanism, lapping the end of each bundle onto the end of the one next preceding it, and successively compressing the bundles so fed to form a compact rope, substantially as specified.

2. The method of forming fillers for cigars, herein described, which consists in first grouping a number of leaves of tobacco parallel in the direction of their length to form a bundle of approximately the diameter of a cigar-bunch to be formed, then feeding the bundles so formed to a compressing mechanism, lapping the end of one bundle onto the end of the one next preceding it, then successively compressing the bundles so fed to form a compact rope, and then cutting the rope into short fillers, substantially as specified.

3. The method of forming a continuous filler to be afterward cut up into proper lengths for cigars, which consist of first grouping a number of leaves of tobacco parallel in the direction of their length to form a continuous bundle approximately of the diameter of the bunch to be formed, then carrying the same lengthwise while retaining its form, and finally cutting up the bundle into sections suitable to make cigars.

4. The method of forming a continuous filler to be afterward cut into suitable lengths for cigars, which consists of first grouping a number of leaves or portions of leaves of tobacco parallel to one another in the direction of their length to form a bundle approximately of the diameter of the bunch to be formed, lapping the end of each bundle upon the end of the one next preceding it, then carrying the continuous bundle lengthwise while retaining its form, and then cutting it into suitable lengths for cigars.

5. The method of forming a continuous filler to be afterward cut into proper lengths for cigars, which consists of first grouping a number of leaves of tobacco parallel in the direction of their length to form a continuous bundle approximately of the diameter of the bunch to be formed, then carrying it endwise and compressing it as it advances, and finally cutting it into lengths suitable for cigars.

6. The method of preparing a cigar-filler for subsequent treatment by first grouping together a number of leaves of tobacco in parallel lengths and approximately of the diameter of the cigar to be made, and then packing the same into a traveling receptacle of suitable form and arranging them into a continuous rope as they are packed.

7. In a machine for forming fillers for cigars, the combination of an endless grooved traveling band, a table having a flat surface situated directly over the said band, with a slot therein of a width practically the same as the groove in the traveling band, through which slot bundles of tobacco-leaves are introduced directly into the said band, and suitable compressing devices which co-operate with the said grooved band, substantially as specified.

8. In a machine for forming the fillers for cigars, an endless band having a groove therein to receive the bundles of tobacco, combined with a table situated over the said band having a slot therein through which the tobacco is introduced directly to the said band, and an inclined block at the end of the said slot to force the tobacco as it leaves the hands of the feeding attendant within the said groove, substantially as specified.

9. In a machine for forming the fillers for cigars, the combination of an endless grooved traveling band, devices to press tobacco therein, and a switch-block having an aperture which extends longitudinally of the band and a spur which enters the groove in the said band to guide the continuous filler formed in the same into the said aperture, substantially as specified.

10. In a machine for forming the fillers for cigars, the combination of an endless grooved traveling band, devices to press tobacco therein, a switch-block having an aperture which extends longitudinally of the band, and a spur which enters the groove in the said band to guide the continuous filler formed in the same into the said aperture, and a knife adapted to have a reciprocating movement across the end of the said switch-block, substantially as specified.

11. In a machine for forming fillers for cigars, the combination of an endless grooved traveling band, devices to press tobacco therein, a switch-block having an aperture which extends longitudinally of the band, and a spur which enters the groove in the said band to guide the continuous filler formed in the same into the said aperture, and a triangular knife adapted to have a reciprocating movement across the end of the said switch-block, substantially as specified.

12. In a machine for forming fillers for cigars, the combination of an endless grooved traveling band and devices for forcing tobacco therein, a hollow block having a triangular end, and a triangular knife adapted to have a reciprocating movement across the triangular end of the said block, substantially as specified.

13. In a cigar-machine, the combination of a filler-forming mechanism, a table, a conveyer to carry the fillers longitudinally of the said table, and filler rolling-up devices arranged on the said table and laterally of the said conveyer, substantially as specified.

BERNHARD BARON.

Witnesses:

M. TURNER,

H. MACCARTHY,

FELIX R. SULLIVAN.